(12) United States Patent
Grubb

(10) Patent No.: US 6,422,849 B1
(45) Date of Patent: Jul. 23, 2002

(54) WINDSHIELD CRACK REPAIR TOOL

(76) Inventor: Christopher A. Grubb, 3917 NW. 15th St., Okla. City, OK (US) 73107

( * ) Notice: Subject to any disclaimer, the term of this patent is extended or adjusted under 35 U.S.C. 154(b) by 0 days.

(21) Appl. No.: 09/512,722

(22) Filed: Feb. 24, 2000

(51) Int. Cl.7 .............................................. B32B 35/00
(52) U.S. Cl. ......................... 425/12; 425/13; 264/36.21
(58) Field of Search ............................. 425/11, 12, 13; 156/94; 264/36.21; 427/140

(56) References Cited

U.S. PATENT DOCUMENTS

| | | | | |
|---|---|---|---|---|
| 3,861,850 A | * | 1/1975 | Wallis | 425/376 |
| 4,047,863 A | * | 9/1977 | McCluskey et al. | 425/13 |
| 4,385,015 A | * | 5/1983 | Klettke | 425/12 |
| 4,954,300 A | * | 9/1990 | Dotson | 425/12 |
| 4,995,798 A | * | 2/1991 | Ameter | 425/12 |
| 5,425,827 A | * | 6/1995 | Campfield | 425/13 |

* cited by examiner

Primary Examiner—Robert Davis
Assistant Examiner—Thu Khanh T. Nguyen
(74) Attorney, Agent, or Firm—Robert H. Frantz

(57) ABSTRACT

The present invention employs an injector base which provides a platform for the components of the overall injector tool. Connected to the injector base is a suction cup which is used to attach the injector tool to the windshield. Mounted on the injector base are two stabilizers, which allow the base to be stabilized for movement against or relative to the windshield, and an injector shell for applying vacuum, pressure and resin to the windshield crack. The injector shell includes internal to it a bore with a notched injector rod, through which resin is applied to the crack under pressure. At the bottom of the injector shell is an injector tip which is a rubber like material which is place around the crack to be filled and at the top of the injector shell is a handle which is threaded onto the injector shell by turning the handle clockwise places the area just above the crack under pressure and by turning the handle counter-clockwise places the area above the crack under negative pressure or in a vacuum. Resin is introduced into the bore of the injector shell, and an integral notch on the injector rod allows for a two-way valve to be formed for both the pressure and vacuum cycles.

10 Claims, 4 Drawing Sheets

WINDSHIELD CRACK REPAIR TOOL

TECHNICAL FIELD OF THE INVENTION

This invention pertains to the arts of repairing cracks in laminated glass items, such as motor vehicle windshields. This invention in particular to relates tools which use resin and/or epoxy applied during one or more vacuum and pressure cycles to evacuate a crack and then fill the crack with the resin or the epoxy.

CROSS-REFERENCE TO RELATED APPLICATIONS

Not applicable.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

Modem automobile and vehicle windshields are made of two plies of glass with a thin sheet of plastic disposed between the two layers of glass. This is called safety glass in the industry. When the glass is struck by a missile, such as a rock or flying piece of debris, at high speed from the exterior of the car, the outer layer of glass typically cracks or pits. However, often the inner layer does not. This results in what is called a spider crack or a "bull's eye" chip.

As replacement of the windshield can be very expensive and prohibitive in many situations, especially in situations where the crack or the bulls eye is not in the direct view of the driver of the vehicle, it is desirable to repair the crack such that it most importantly will not spread any further. Additionally, it is desirable to repair the crack so that it may be less visible or even invisible to the driver.

In order to repair such a spider or "bull's eye" crack, one current method is known in the art in which the crack is evacuated. Then, resin or epoxy is placed in the crack under pressure. The cycle may be repeated once or twice in order to completely void the crack of air, and to completely fill it with resin or epoxy. If the resin or epoxy has a light refraction coefficient similar to glass, the filled crack will be nearly invisible to the human eye.

Several tools to implement this repair method are available within the art today. The first of the tools is a general group of tools used by professional or industrial users in which an electric pump is used to pull a high level of vacuum on the crack. Then, resin is introduced into the crack, and the pump's action is reversed to place pressure on the resin, pushing it into the void formed by the crack. This cycle is usually repeated several times, pulling out air bubbles and pushing in more resin. These tools are generally expensive, and require a considerable maintenance time. Additionally, they waste some portion of the expensive resin or epoxy which is used to fill the crack, as the unused resin or epoxy from a particular repair job cannot be recovered or stored for the next job. Further, the clean up time is especially significant in that the tip or the applicator end of the tool must be cleaned thoroughly after each application in order to remove any excess resin. The pumps themselves are fairly complicated and have a high failure rate and also are very expensive to own.

The windshield repair industry is very competitive. Most of these services are offered on the customer's site. A service truck typically travels to a parking lot where the automobile with the crack windshield is parked, and the crack repair is performed on-site where the car is parked. This means for the fee charged for the repair must include travel time, fuel, set-up time, the actual time to make the repair, and clean-up time. Therefore, any technology that can reduce any of those phases of the repair and also reduce the wasted materials will result in higher profitability and/or lower service charges.

Another tool commonly used to effect a similar type crack repair is a consumer device available at most car repair and car shops. The device consists of an adhesive tip which is applied over the crack on the windshield, and then is mated with a syringe device. The syringe plunger is then pulled back in order to place the crack under a small vacuum, then resin or epoxy is introduced into the hollow interior of the syringe. Finally, the syringe plunger is pressed into the syringe placing the resin under pressure and forcing the resin into the crack. This cycle may be repeated several times.

While this device is not able to pull as strong a vacuum or place the resin under as great of a pressure as the professional device, it is much less expensive than the price of a service charge for professional service. However, it cannot repair larger cracks and cannot make the cracks as invisible as the professional tool can.

Therefore, there is a need in the art for a professional grade tool which does not waste unused resin or epoxy, which has quicker set-up and clean-up times than the current technology, and which is more reliable than currently available pump-based tools. Further, there is a need in the art for this professional grade tool to be easy to use.

SUMMARY OF THE INVENTION

The present invention employs an injector base which provides a platform for the components of the integrated injector tool. Connected to the injector base is a suction cup which is used to attach the injector tool to the cracked windshield. Mounted on the injector base are two stabilizers which allow the base to be stabilized for movement against or relative to the windshield. Also attached to the injector base is an injector shell which includes internal to it, a bore with an injector rod, through which pressure and vacuum cycles are created, and through which resin is applied to the crack. At the bottom of the injector shell is a rubber-like injector tip which is place around the crack to be filled. At the top of the injector shell is a handle which is threaded onto the injector shell. By turning the handle clockwise, the area just above the crack is placed under pressure, and by turning the handle counter-clockwise, the area above the crack is placed under negative pressure or in a vacuum. Resin is introduced into the core or the bore of the injector shell and an integral notch on the injector rod allows for a two-way valve to be formed for both the pressure and vacuum cycles. Unused resin or epoxy can be stored in the reservoir for use during the next repair.

BRIEF DESCRIPTION OF THE DRAWINGS

The figures presented herein when taken in conjunction with the disclosure form a complete description of the invention.

DETAILED DESCRIPTION OF THE INVENTION

The objects, features, and advantages of the invention will be apparent from the following detailed description of a preferred embodiment of the invention which is illustrated in the accompanying drawings in which like number references indicate like parts of the inventions.

Figure 1:
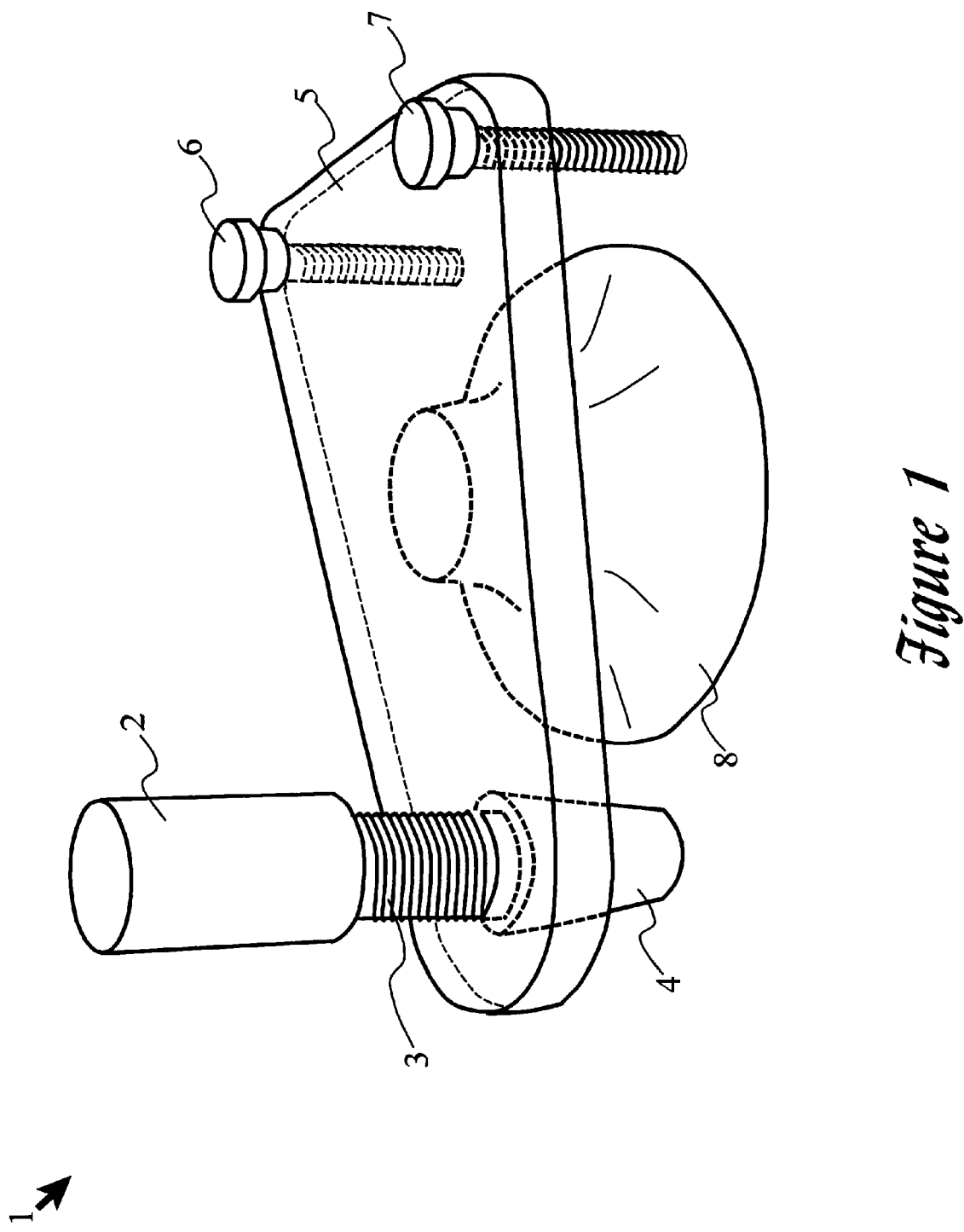
FIG. 1 presents an overall view of the injector tool.

Turning to FIG. 1, the entire injector tool is shown (1). The injector base (5) is preferably constructed of plastic or another suitably rigid material. In the preferred embodiment it is constructed of approximately one-half inch Lexan plastic, but may be made of other molded materials or other suitable rigid materials. On the bottom side of the base (5) is a suction cup (8), which is mounted onto the windshield by pressing the suction cup into a flatter position. This holds the tool onto the windshield while being repaired.

Through the injector base (5) are mounted two stabilizers (6 and 7). The stabilizers are threaded through the injector base such that turning the stabilizers clockwise lowers the stabilizers tips until they come into contact with the surface of the windshield. This allows them to be lowered into place to place the injector base into a stable position for the repair cycle. Also threaded through the injector base (5) is an injector shell (3). At the bottom of the injector shell (3) is an injector tip (4), which comes in contact which the area which has the crack in the windshield.

At the top of the injector shell (3) is the actuator handle (2). The actuator handle (2) is threaded onto the injector shell (3). In order to place the area around and in the crack on the windshield under pressure, the handle is rotated clockwise when viewed from above. In order to place the crack and area above the crack in a vacuum, the handle is rotated counter-clockwise when viewed from above.

Figure 2:
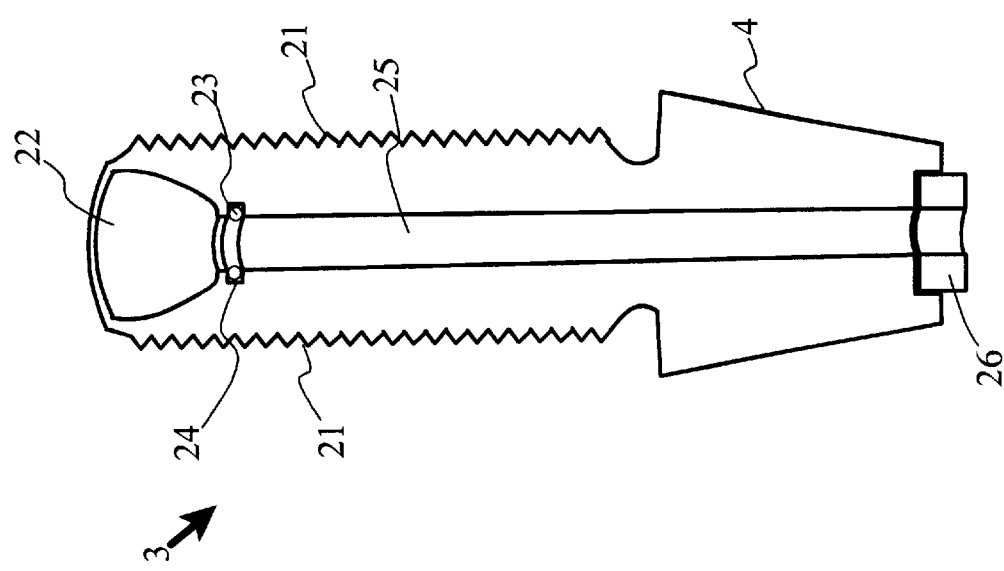
FIG. 2 shows a cut away view of the injector shell.

Turning to FIG. 2, a cut-away view of the injector shell (3) is shown in detail. The outer area of the injector shell (3) is threaded (21) in order to receive the handle (2) of the injector tool. At the lower end of the injector shell (3) is formed an injector tip (4) which may be slightly fluted or straight. In the preferred embodiment it is slightly fluted.

Figure 3:
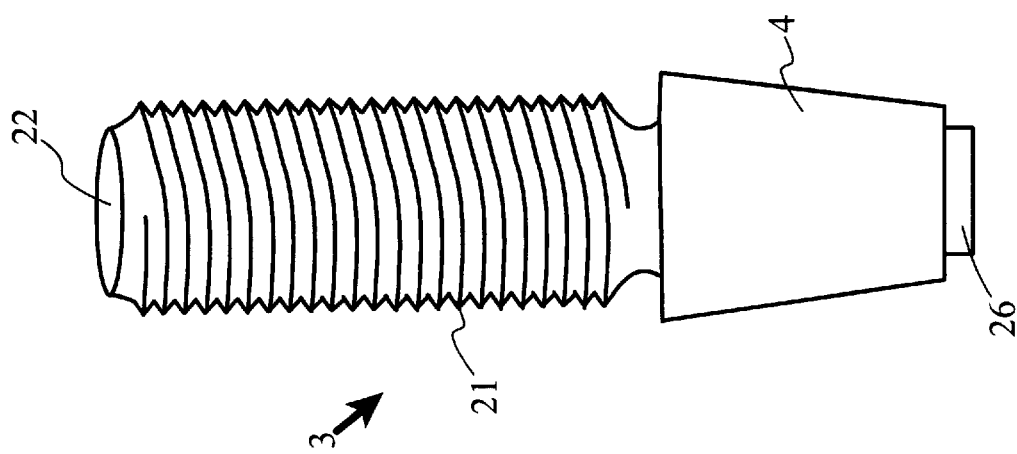
FIG. 3 shows an external view of the injector shell.

The injector tip (4) includes a seat for an rubber-like injector ring (26). An upper reservoir (22) for receiving resin or epoxy is located at the upper end of the injector shell (3). Just below the upper reservoir (22) is an O-ring slot (24) for receiving an O-ring (23). In the preferred embodiment the O-ring (23) is a Teflon ring or other flouropolymer-enhanced O-ring, and the injector ring (26) is a short piece of rubber or resilient plastic tubing material. Through the center of the injector shell (3) is formed a bore (25) for receiving the injector rod. An outer view of the injector shell (3) is shown in FIG. 3.

Figure 4:
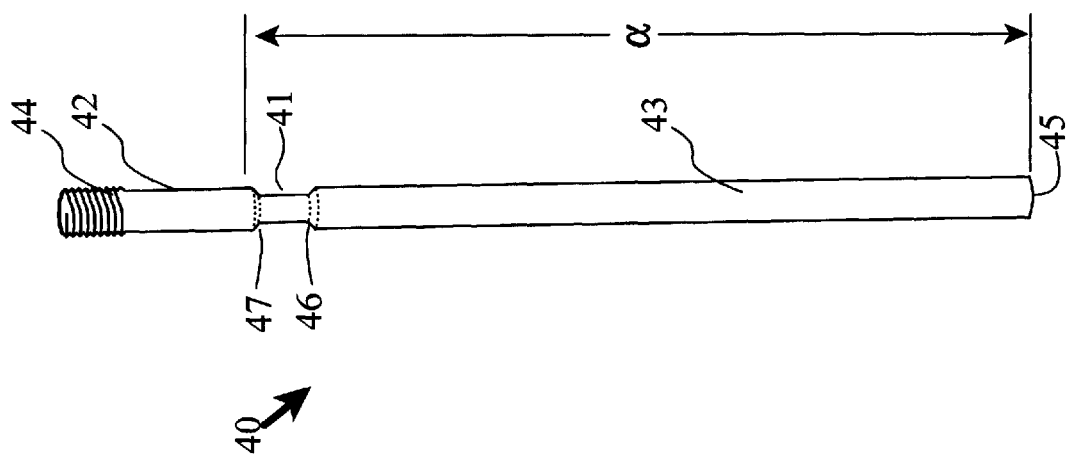
FIG. 4 depicts the shape of the injector rod.

The injector rod (40) is depicted in detail in FIG. 4. At the upper end of the injector rod (40) are threads (44) for mounting the handle onto the rod. Just below the handle mounting threads (44) is an upper portion of the rod (42). Below the upper portion of the rod (42) is a rod notch (41), and just below rod notch (41) is a lower rod section (43). The rod notch (41) is bordered by an upper notch shoulder (47) and a lower notch shoulder (46). At the lowest end of the injector rod is the rod tip (45).

The injector rod (40) is preferably fabricated of stainless steel or other suitable rigid material, but may alternatively be fabricated of plastic. The injector rod is preferably of a diameter approximately 20 one-thousandths of an inch (0.020 inch) smaller than the diameter of the bore (25) as shown in FIG. 2. This allows for a loose fit of the rod in the bore, and also allows for epoxy and resin to flow between the wall of the bore (25) and the outer surface of the injector rod (40), from the upper reservoir to the injector ring.

Figure 5:
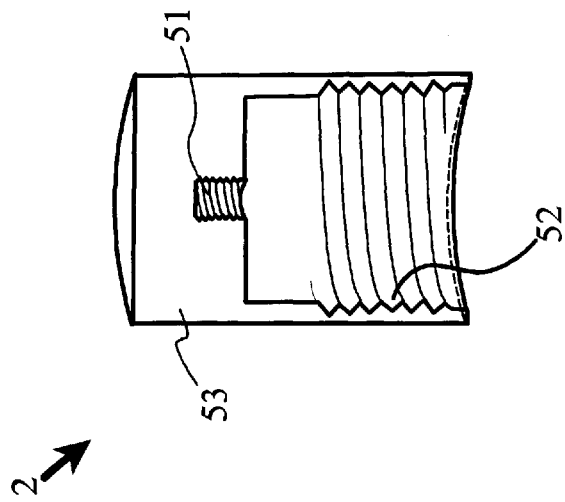
FIG. 5 shows a cut away view of the injector handle.

FIG. 5 shows a cut away-view of the handle (2), including more detail of the injector mounting threads (52) for mating with the threaded injector shell, and also details of the rod mounting threads (51) for mating with the threaded injector rod. The handle mounting body (53) is preferably constructed of either solid or molded or milled plastic, but also may be constructed of solid metal or other suitable rigid material. The injector shell mounting threads (52) mate with the handle mounting threads (21) on the injector shell (3). The rod mounting threads (51) in the handle body (53) mate with the handle attachment threads (44) located at the upper end of the injector rod (40).

Figure 6:
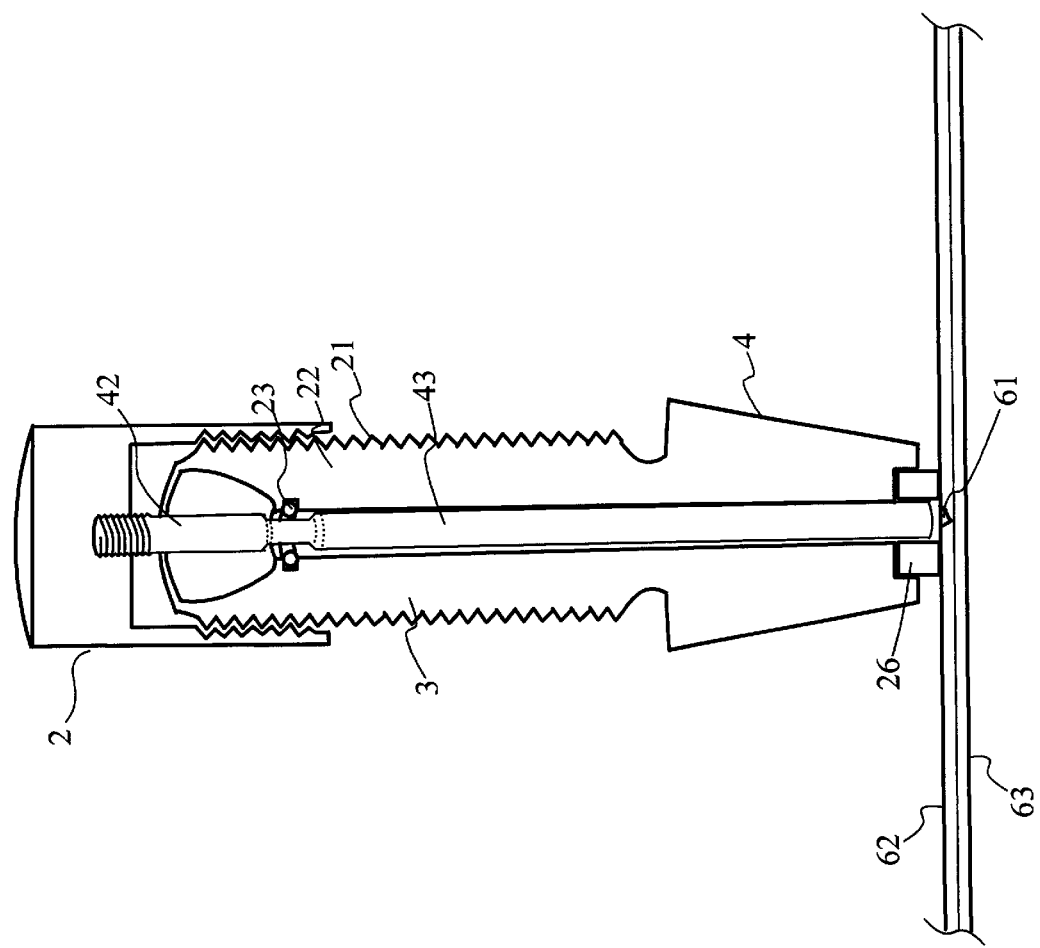
FIG. 6 shows the injector shell with the rod and handle in operation over a crack on a windshield.

Turning to FIG. 6, the entire assembled injector shell is shown mounted on a windshield. First, the upper reservoir (22) of the injector shell is filled with epoxy or resin. Then, the injector rod is threadably mounted to the handle (2), and the handle is threadably mounted to the injector shell (3). The injector rod extends downward through the upper bore of the injector shell into the area of the injector tip ring (26).

Initially, the handle is turned clockwise such that the injector rod is lowered to a position where the O-ring (23) is positioned above the lower shoulder of the rod notch and below the upper shoulder of the rod notch. This provides a flow path for the resin to flow from the upper reservoir through the rod notch and between the walls of the bore and the injector rod. The resin continues to flow further downward between the walls of the bore and the outer surface of the injector rod, until it reaches the area captive around and above the crack surrounded by the injector tip ring (26).

After sufficient time has been allowed for the resin to flow downward into the repair area located inside of the injector ring (26), the handle is turned counter-clockwise to move the rod towards an upper position in which the O-ring (23) comes into contact with the lower shoulder (46) of the rod notch (41). The O-ring (23) forms a gas and liquid-tight seal against the outer surface of the injector rod. As the handle is further turned counter-clockwise, the rod is raised further. This causes a vacuum to be formed in the repair area internal to ring (26).

After sufficient time has been allowed for evacuation and air bubbles to be extracted from the crack void, the handle is turned in a clockwise direction which lowers the rod. Initially during the downward travel of the injector rod, the O-ring passes into the middle portion of the rod notch (41), and additional resin is allowed to flow downward towards the repair site internal to the tip ring (26). As the injector rod travel continues downward, the O-ring comes into contact with the upper shoulder (47) of the rod notch (41) and forms an air-tight and liquid-tight seal against the injector rod. As the handle is continued to be turned clockwise, the area of the repair site is placed under pressure, which forces some amount of resin into the previously-evacuated crack void. After sufficient time has elapsed for the resin to be forced into the void, the cycle can be repeated, adding resin as necessary to the upper reservoir.

In the preferred embodiment, the injector shell and handle are constructed of a durable plastic such as Delron plastic. Also, in the preferred embodiment, the depth of the threaded portion of the handle (53) which receives the injector shell is matched with the length of the injector rod and the length of the injector shell so that when the handle is fully rotated clockwise such as it is completely threaded onto the injector shell the rod shall not extend further than the surface of the injector ring (26) (dimension "alpha" as shown in FIG. 4). This will prevent the rod tip from coming into contact physically with the crack portion of glass and possibly cracking the glass further.

While the disclosure contained herein has set forth a preferred embodiment of the invention and the fundamental mechanical components used within the invention are well-known within the art, it will be appreciated by those who skilled in the art that variations to the combination of elements, materials, and steps disclosed can be made without departing from the scope and spirit of the invention.

What is claimed is:

1. An injector device for use in repair of cracks in glass through in evacuation of the crack void and injection of repair chemical, said injector device comprising:

an injector shell having a generally cylindrical shape, with an open upper and an open lower end, and having a liquid repair chemical storage reservoir formed towards the upper end, an injector tip ring seat formed at the lower end, a bore formed coaxially through the cylindrical shell to form a repair chemical communication path between the reservoir and the lower end of the shell, said bore including an O-ring seat formed circumferentially about said bore for receiving an O-ring, and a means for mounting a handle and injector rod assembly to the injector shell;

an O-ring disposed in said O-ring seat in the bore;

a resilient injector tip ring disposed in said injector tip ring seat;

a handle and injector rod assembly, movably attachable to said means for mounting on said injector shell, said handle and injector rod assembly having an injector rod of sufficient diameter to be received in said bore of the injector shell with sufficient clearance between said rod and said bore for flow of liquid repair chemical, and also of sufficient diameter to form an air-tight and liquid-tight seal when positioned in contact with said O-ring; and an integral valve for applying vacuum and pressure at said injector shell lower end, said valve comprising a portion on the injector rod having less diameter than the general diameter of the rod such that three rod positions are selectable by an operator including a first rod position for applying pressure to a crack in glass and for storage of resin between repair operations in which the valve causes pressure at the lower end of the injector shell and prevents the flow of fluid from said reservoir to said injector shell lower end, a second rod position in which a fluid and gas communication path is provided by said valve between said reservoir and said injector shell lower end, and a third rod position in which the valve causes a vacuum at the lower end of the injector shell and prevents the flow of fluid from said reservoir to said injector shell lower end.

2. An injector device for use in repair of cracks in glass as set forth in claim 1, wherein said valve portion of the injector rod further comprises a notch formed coaxially around the injector rod, thereby forming an upper notch shoulder and a lower notch shoulder between which an air and liquid repair chemical flow path is formed.

3. An injector device for use in repair of cracks in glass as set forth in claim 1, wherein said valve portion of the injector rod further comprises groove longitudinally formed on the injector rod, thereby forming communication path from said reservoir to said injector shell lower end for air and liquid repair chemical.

4. An injector device for use in repair of cracks in glass as set forth in claim 1 wherein said means for mounting the handle and injector rod assembly to the injector shell comprises threads disposed on the injector shell and in the handle.

5. An injector device for use in repair of cracks in glass as set forth in claim 1 wherein said O-ring is a fluoropolymer-enhanced O-ring.

6. An injector device for use in repair of cracks in glass as set forth in claim 1 wherein said injector tip ring comprises a section of rubber-like tubing.

7. An injector device for use in repair of cracks in glass as set forth in claim 1 wherein said injector shell is fabricated of plastic.

8. An injector device for use in repair of cracks in glass as set forth in claim 1 wherein said injector shell is fabricated of metal.

9. An injector device for use in repair of cracks in glass as set forth in claim 1 wherein said injector rod is fabricated of stainless steel.

10. An injector device for use in repair of cracks in glass as set forth in claim 1 wherein said injector rod has an overall length matched to the stroke of the bore such that the injector rod is contained entirely within the bore of the injector shell for all possible positions of the handle, thereby preventing contact of the injector rod with the glass under repair.

* * * * *